Jan. 23, 1934.  H. L. JOHNSTON  1,944,181
FOOD HANDLING APPARATUS
Filed Jan. 23, 1930   7 Sheets-Sheet 1

INVENTOR
Herbert L. Johnston
BY Maréchal and Noé
ATTORNEYS

Jan. 23, 1934.  H. L. JOHNSTON  1,944,181
FOOD HANDLING APPARATUS
Filed Jan. 23, 1930  7 Sheets-Sheet 2

INVENTOR
Herbert L. Johnston
BY Maréchal and Noe
ATTORNEYS

Jan. 23, 1934.   H. L. JOHNSTON   1,944,181
FOOD HANDLING APPARATUS
Filed Jan. 23, 1930   7 Sheets-Sheet 4

INVENTOR
Herbert L. Johnston
BY Maréchal and Noe
ATTORNEYS

INVENTOR
Herbert L. Johnston
BY Maréchal and Noe
ATTORNEYS

Patented Jan. 23, 1934

1,944,181

UNITED STATES PATENT OFFICE 1,944,181

FOOD HANDLING APPARATUS

Herbert L. Johnston, Troy, Ohio, assignor to The Hobart Manufacturing Company, Troy, Ohio, a corporation of Ohio Application January 23, 1930. Serial No. 422,746

13 Claims. (Cl. 146—102)

This invention relates to food handling apparatus and more particularly to slicing machines.

One of the principal objects of the invention is to provide apparatus of this character which is simple in construction, is highly effective in operation, is sturdy and has long life, is sanitary and easily cleaned, and is safely and readily operated and controlled.

Another object of the invention is to provide a machine of this character with highly effective means for varying and controlling the thickness of the slices being cut.

Still another object of the invention is to provide a machine of this character with efficient means for supporting the articles to be sliced and moving them relative to the slicing knife.

Other objects and advantages of the invention will be apparent from the following description, the accompanying drawings and appended claims.

In the drawings, in which like characters of reference are used to denote like parts throughout the several views thereof—

Referring to the drawings, in which is disclosed a preferred embodiment of the invention, the numeral 10 indicates the base of the machine which is illustrated as a casting, generally rectangular in shape and provided on the under side thereof with a peripheral groove 11 receiving a supporting rubber band 12. The base 10 carries a raised portion or upwardly extending rectangular projection 14 upon which is mounted an integral motor casing and gear housing 16. Mounted within this casing and movable into or out of position as a whole, is an electric motor assembly 15, having an extended motor shaft 17 supported within suitable bearings 13 carried by the wall of the gear housing. Mounted on the extended end of shaft 17 is a worm gear 18 having on the outer end thereof diametrically opposed projections 18' in alignment with a diametrical tongue or projections 17' formed in the end of shaft 17. A locking member 19 is provided which has a diametrical groove 19' receiving the projections 17' and 18', and is held by screw 19a threaded into the end of shaft 17, to lock the shaft and worm to rotate together. A removable cover 16' is mounted on the rear of housing 16, being secured in place by through bolts 16a. Upon removal of screw 19a, the key member 19 and the worm 18 may be slid off this extended end of shaft 17, and then upon loosening of the through bolts 16ᵃ and removal of rear cover 16', the motor 15 and shaft 17 may be removed as a unit by sliding rearwardly out of the then exposed end of the motor casing and gear housing 16. Worm 18 meshes with a worm gear 20 pinned at 20' to a cross shaft 21 mounted in roller bearings 22 and 23 within housing 16. Removable covers 24 and 26 fastened over openings in housing 16 in alignment with the ends of shafts 21 and 17 respectively provide access to these shafts and related parts.

Shaft 21 is provided adjacent its front end with a knife supporting flange 28, the end 29 of the shaft beyond the flange being of reduced diameter to receive a rotary knife 30 which is fastened to shaft 21 by means of screws 31 which enter threaded sockets within the flange 28. This knife is of the usual circular disk type with a beveled portion 32 on the rear face forming a peripheral cutting edge, and has a circular recess 33 in the front face thereof to receive the guard plate 34.

The shaft 21 just back of the flange 28 has an enlargement or shoulder 35, which serves as an abutment for the inner race of the roller bearing 23, and cooperates with a closure plate 36. This plate, which is removably held in place within the opening in housing 16 through which the forward end of the shaft 21 extends, has a surrounding groove 37, or labyrinth packing, which serves to prevent outward leakage of grease along the shaft. The construction is such that the inner race of the bearing overlies the joint of the closure plate with the enlargement 35 thus additionally protecting against oil or grease leakage. If desired a felt grease ring may be used in groove 37. A cup shaped member 38 is mounted for rotation with shaft 21 just back of the knife 30. This member 38, which may be formed of spring sheet metal, has its inner edge 39 turned over and held in place under tension against a shoulder 28' formed on flange 28 when the knife 30 is clamped in place by screws 31, so that the cup shaped member is securely held in place between the back of knife 30 and shoulder 28'. The outer cylindrical portion of this cup member 38 surrounds the outer periphery of the closure plate 36, and as it rotates with the knife functions to additionally seal against the leakage of grease or oil along the shaft 21. Shaft 21 and bearings 22 and 23 are clamped in operating position between annular shoulders 40 and 40' formed within housing 16 by means of shoulder 35, nut 41' threaded on the end of shaft 21, and the washer 42 which bears against the inner race of the bearing 22.

Mounted on upstanding hollow rectangular boxes 50 and 50' at opposite corners of the front side of base 10 is a track 51 upon which a carriage 52 is slidably mounted. As shown the track is a cylindrical bar which rests in groove 51' formed in the tops of boxes 50 and 50', and is rigidly held in position by suitable bolts or screws which pass upwardly through the tops of boxes 50 and 50'. This circular track 51 passes through an elongated bearing sleeve 53 carried by carriage 52, the arrangement being such that the carriage during operation may be readily moved back and forth along the track. The carriage has a downwardly extending arm 54 to which is bolted a guiding plate 55 having an inturned and upturned flange portion 56 extending around a track or guide rail 57 which is suitably bolted or screwed to the front face of base 10. Suitable shims 58 may be positioned between the plate 55 and the track 57, adjusting screws 59 being threaded within plate 55 and bearing against the shims so as to permit adjustment to take up play, due to wear, etc. Bolted to an extension 76 on carriage 52 is a depending arm 77 carrying a curved bearing shoe 78 which rests slidably upon the track 51 and stabilizes the movement of the carriage. Abutments 79 and 79' on carriage 52 are adapted to respectively engage the boxes 50 and 50' to limit the travel of the carriage. This arrangement is such that a strong yet simple mounting is provided and yet the shoe is free to slide to the extreme end of the track thereby permitting of shortening the overall dimensions of the machine.

The carriage 52 is arranged to receive the material to be sliced, and includes an inclined V-shaped trough, having its sides 60 and 61 arranged at substantially right angles to each other. The trough member may comprise a metal stamping screwed, or otherwise suitably connected to similarly arranged extensions 62 and 63 on the carriage. The portion 63 carries upwardly extending lugs 64 and 65 having aligned sockets within which is pinned a rod 66. Rotatably mounted on the rod 66 is a member 67 which has thereon spaced lugs 68 and 69, having aligned openings to slidably receive the rod 66. As shown the member 67 is arranged with the lug 68 positioned between the lugs 64 and 65, and the lug 69 on the outer side of lug 64.

This member 67 is also provided with forwardly extending spaced bearing lugs 43 and 44, within which is rotatably mounted a rod 45. This rod is pinned at 45' to an inner bearing sleeve 46 rotatably mounted in lug 43. Sleeve 46 is formed with an annular flange 46' having a flattened outer face, between which and the correspondingly flattened inner face of lug 43 is mounted a suitable compressible washer 46ᵃ. Flange 46' also has a flat inner face to which is attached a pusher plate 71 adapted to operate within the V-trough, upon the foodstuffs therein. This pusher plate is formed of sheet metal and has a flat vertical face provided with outwardly projecting teeth or prongs 72 and a narrow bottom face 73 provided with downwardly projecting teeth 74 for engagement with the meat or other material in the trough to be sliced. Pads or projections 75 are fastened to the under side of the bottom face 73 at opposite ends thereof to prevent scratching of the V-trough by the teeth 74. One form of member for doing this may be an extended prong or tooth having a rounded and flattened lower portion adapted to rest upon the trough. Handle 70 is mounted on rod 45 between lugs 43 and 44, and is keyed at 70' to rod 45 to rotate therewith. At its outer end, rod 45 is formed with a portion 45ᵃ of reduced diameter which receives a bearing sleeve 47 rotatably mounted in lug 44. Bearing sleeve 47 has an outer shoulder 47' adapted to engage the lug 44 to limit its inward movement, and the parts are tightened and held in operating position by a washer 48 and a screw 48' which threads within a threaded bore in the outer end of portion 45ᵃ of rod 45. A spring 49 mounted within a suitable bore 70ᵃ in the outer end of handle 70, and bearing at one end against sleeve 47 and at the other end against handle 70, is compressed as crew 48' is tightened to thereby take up play and resiliently maintain the parts in operating position. This handle serves to conveniently move the carriage back and forth along its track during slicing operation; and also to vary the positioning of the pusher plate to properly engage and urge the meat, or the like, toward the slicing knife. In addition, it serves to swing the pusher plate, to rotate it about its carrying rod to such extent as the operating conditions make desirable—and because of the rotary mounting of the handle 70 within the arm or member 67, the operator may also rock the pusher plate to various angular positions with reference to the V-trough to accommodate variations in size and shape of the foodstuffs being sliced.

In order to regulate the thickness of the slices being cut, a gage plate is adjustably mounted in association with the rotary knife 30. As shown more particularly in Figs. 4 and 5, the base 10 is formed with spaced tracks 81 and 82 which are inclined to the plane of the knife. A portion of the base between these tracks is cut away. A member 83 having an integrally formed projection 84, is slidably supported on flat bearing surfaces between tracks 81 and 82 and upon a flat bearing portion 85 on the upper surface of the base 10. Bolted to the underside of slide 84 are spaced guide shoes 86 and 87 which overlap and ride on depending flat bearing pads 89 and 89' formed on the undersurface of base 10 below tracks 81 and 82. A bolt 90 is threaded within the member 83, this bolt passing through a slot 91, formed in the base 10 as an extension of the opening in the base between the tracks. This bolt is formed with a limiting shoulder 90'. Surrounding the bolt 90 is a spring plate 92. This plate is positioned below the slot 91 and is held by the nut 93 in desired contact with the lower face of the base, to adjust and compensate for wear—to give a ready sliding contact. The nut 93 is held in adjusted position by a cotter key 94, the bolt having a plurality of passages to permit of suitably fine adjustment. A spring 95 is connected at one end to the plate 92, and has its outer end connected to a fixed part of the base 10. As shown this spring is detachably connected to the base by means of the bolt 96. This spring is under suitable tension and urges the slidable member 83 towards the back of the base.

Bolted to the member or slide 83 is a gage supporting member or gage plate back 97 which carries the gage plate 98. Extending upwardly from the base, alongside the tracks 81 and 82, are guides 99 and 100 spaced and finished to receive and guide the slide member 83. The member 97 extends sideways to overlie the top surfaces of the guides 99—100 to cover the joints between the slide 83 and the guides 99—100.

Figure 6:
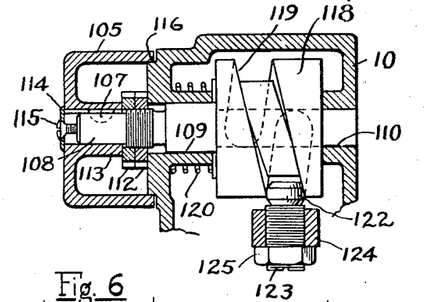
Fig. 6 is a detail vertical sectional view taken on the plane of the line 6—6 of Fig. 4.

A rotatable knurled adjusting wheel or handle 105, having suitable indicating lines 106 thereon cooperating with an indicating line formed on the base, is keyed at 107 to a shaft 108 rotatably mounted in suitable bearings 109 and 110 within box 50 of the base 10, an opening being provided in the base beneath box 50. Shaft 108 is threaded at its outer end and receives thereon threaded spacers or washers 112 interposed between the hub portion 113 of wheel 105 and the adjoining end of box 50. A retaining washer 114 and screw 115 retain the wheel on shaft 108. A forwardly extending circular flange 116 receives the cylindrical end of wheel 105. Mounted on shaft 108 for rotation therewith is a cam member 118 having a cam groove 119 formed therein. A spring 120 is interposed between the wall of base 10 and the cam member 118 to urge the shaft 108 and related parts to the right, as shown in Fig. 6, to thereby take up play in the adjusting mechanism.

Figure 7:
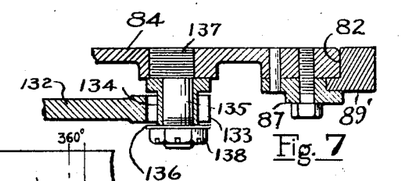
Fig. 7 is a detail sectional view taken on the plane of the line 7—7 of Fig. 4.

Positioned within groove 119 is a cam follower 122 having a central cylindrical portion and tapered end portions, the follower being formed on the end of a screw 123 which is threadedly received within a bore in the end of one arm 124 of a bell crank lever, the screw being fastened in position by nut 125. The bell crank lever is pivotally mounted upon a bolt 128 depending from the under side of base 10, the bolt 128 being threaded at its lower end to receive a nut 129 secured in place by cotter key 130, to retain the lever in position. The other arm 132 of the bell crank lever is forked at its outer end 133 to receive (as shown more clearly in Fig. 7) a sleeve 134 mounted on a depending pin 135 eccentrically carried by a bolt 137 which is threaded into the slide extension 84. Sleeve 134 and forked arm 133 are retained in position by means of washer 136 and nut 138 threaded upon the outer threaded and slotted end of the pin 135. By turning the adjusting wheel 105, shaft 108 is rotated causing the cam slot 119 to move follower 122 correspondingly to rock the bell crank lever upon its pivot 128 and move member 83 along the tracks 81 and 82 to adjust the position of gage plate 98 relative to the vertical plane of the rotary knife 30.

As shown, the gage plate back 97 has its upper portion offset backward to provide an overhang. Positioned immediately behind the gage member is an enameled slice receiving tray 140, which has an upwardly extending side 141 proportioned to extend in under the overhang in spaced relation thereto. The gage plate back 97 and its associated gage plate 98 are thus securely and rigidly supported by means of the bearing slide, which has a horizontal bearing surface of considerable extent cooperating with the tracks 81 and 82 and bearing surface 85 on base 10, and vertical guiding surfaces cooperating with the vertical bearing surfaces 99 and 100; and desired range of adjustment of the gage plate is thus afforded while conserving space required for this adjusting movement by the construction in which the gage plate overhangs the slice receiving tray 140, and the slide moves beneath the tray 140.

Figure 4:
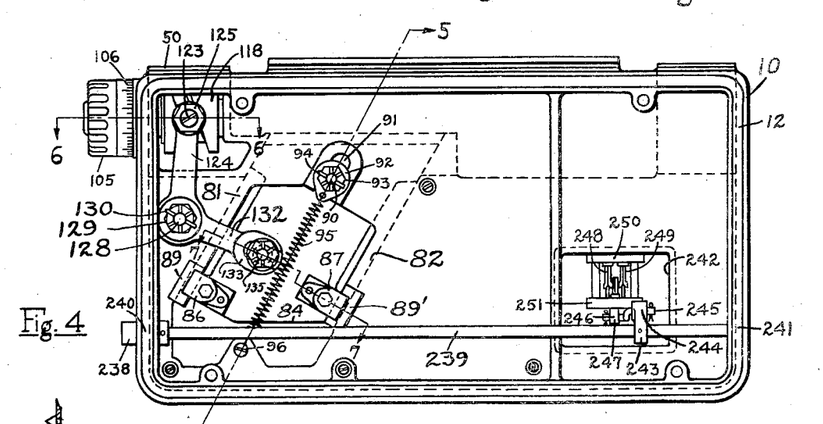
Fig. 4 is a bottom view of the machine looking upwardly upon the base.

As best shown in Fig. 4, the tracks 81 and 82 are arranged diagonally of the base frame, so that the slide and gage plate similarly follow a diagonal path with reference to the plane of the rotary knife. The end of the gage plate adjacent the knife is a curved edge to correspond to the shape of the edge of the rotary knife, as shown by the numeral 148 in Fig. 1. The arrangement is such that when the gage plate is at or near neutral or zero position, in which position it is lying substantially in the plane of the slicing edge of the knife, and therefore positioned to cut slices of minimum thickness, the edge 148 is most closely adjacent the edge of the slicing knife. However, as the gage plate is adjusted along the tracks to cut slices of increased thickness, the plate is also shifted away from the knife edge so that the effective clearance between the edge 148 and the knife is at the same time correspondingly increased.

Figure 6A:
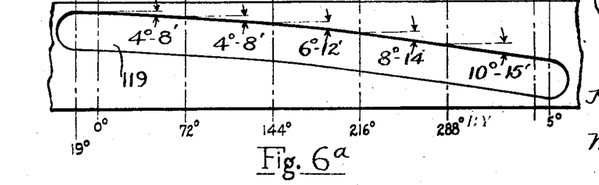
Fig. 6A is a development of the cam groove shown in Fig. 6.

The cam groove 119 is formed with a variable lead which increases progressively from the left hand or outer end to the right hand or inner end, as shown in Fig. 6. The actual cutting of a groove of continuously variable lead is a difficult machining job, and in practice, it is easier to form this cam groove in a plurality of zones each of which is of substantially constant lead, but the succeeding zones (starting from the left hand or outer end of Fig. 6) are of progressively increasing lead. Fig. 6ª is a development of such a variable zone groove, in which a plurality of zones are provided. As a result the degree of movement of the cam follower 122 for a given angular movement of wheel 105 progressively increases as the member 122 travels from the left hand end (which in the setting shown is the zero setting for slices of minimum thickness) to the right hand end (which as shown is the setting for slices of maximum thickness). By reason of this construction, the same angular movement of the control wheel 105 in different zones of the cam groove will cause the gage plate to move to a greater or lesser extent; for example, when it is in the setting for cutting thinner slices, it will move less than when it is in the setting for cutting thicker slices, and the effective lateral movement of the gage plate away from the edge of the knife is also varied correspondingly. The thinner the slices desired, the nicer the adjusting should be. The present arrangement secures this result, in a very simple manner, and gives in effect a highly sensitive or vernier adjustment for the setting, which facilitates accurate setting of the gage plate when very small differences in the thicknesses of slices is desired, such as when cutting very thin slices, without complicated and expensive mechanism. In addition, the effective movement of the gage plate rearwardly from the plane of the knife is also correspondingly variable and bears a constant ratio to the effective lateral movement of the gage plate in the plane of the knife. The resultant of these two movements—which is the actual or effective movement of the gage plate and which for purposes of easier description is herein termed the "absolute" movement of the gage plate—is a predetermined variable; and the amount of absolute movement varies in different zones of the cam groove for a given angular movement of the adjusting wheel 105. Starting, for example, with the adjusting wheel in the zero position, as adjustment is made for thicker slices, the effective rearward and lateral movements are at progressively increasing rates, but the rearward spacing and the lateral spacing are at all times maintained in a proper and constant proportion for efficient slicing operation. The diagonal inclination of the tracks 81 and 82 is coordinated with the varying pitch of the cam groove to give this proper proportioning, very satisfactory results being secured with the construction illustrated in the drawings in which the tracks are inclined at an angle of substantially sixty degrees and the cam groove varies from a pitch of substantially four degrees at the zero setting to a pitch of substantially ten degrees at the maximum setting.

In order to properly position the gage plate 98 with reference to the back support 97, an adjustable connection is provided between these parts. As shown, the gage plate 98 is formed with an upper row of rearwardly extending lugs 150 having aligned openings therein for loosely receiving a rectangular bar 151. A similar series of lugs 152 is provided at the lower side of the gage plate, these lugs having aligned openings 153 loosely receiving a rectangular bar 154. A plurality of screws 155 pass through the back support 97 and engage in threaded openings 156 within the bars 151 and 154. When the screws 155 are loosened, the gage plate 98 and lugs 150 and 152 may then be slid along the bars 151 and 154 to adjust the clearance of the edge 148 with reference to the cutting edge of the slicing knife. The screws are then drawn tight to rigidly hold the gage plate in adjusted position against the upper edge 157 and the lower seating shoulder 158 of the back support 97. To adjust the setting of the mechanism so that the zero position of the gage plate corresponds to the zero setting of the wheel 105, the screw 137 upon loosening of nut 138 is rotated within the slide 84 to thereby shift the position of the eccentric pin 135 which is engaged by the forked end 133 of the bell crank lever. This shifts the slide 84 and gage plate 98 with reference to the bell crank lever and wheel 105.

Figure 1:
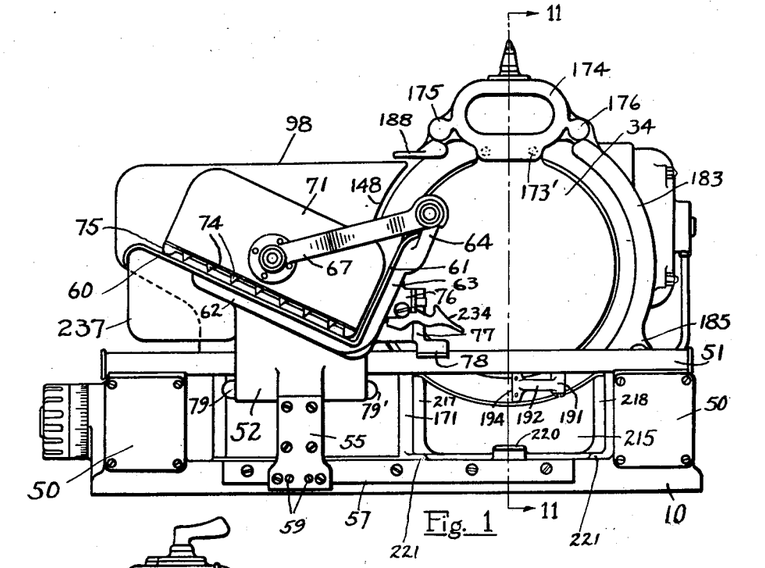
Fig. 1 is a side elevational view of apparatus constructed in accordance with this invention, the view being taken from the front side of the machine.
Figure 2:
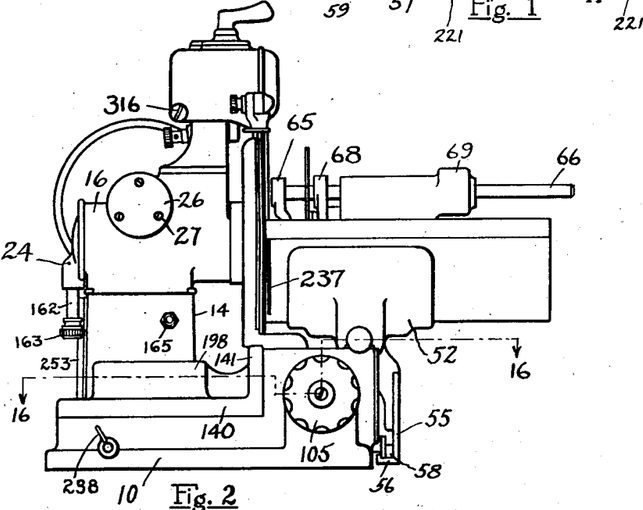
Fig. 2 is an end elevational view of the machine with the deflector for the rear of the knife removed, the view being taken from the control end of the machine.
Figures 3, 18:
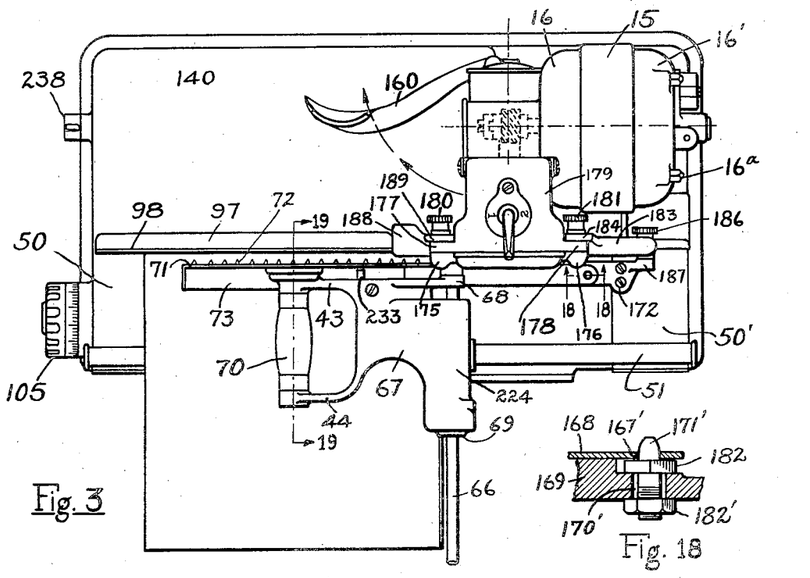
Fig. 3 is a plan view of the machine.
Fig. 18 is a sectional view on the plane of line 18—18 of Fig. 3.

In the slicing operation, the meat or other material to be sliced is placed within the V-trough, and is pushed toward the gage plate 98 by means of the pusher plate 71 at the same time as the carriage is moved along the tracks 51 and 57 by the operator, grasping the handle 70, a slice being cut from the material by the rotary knife on each reciprocation of the carriage away from the operator, who stands at the left end of the machine as viewed in Fig. 1. To guide the slices away from the knife a deflector 160 is provided which has a pivoting lug 161 having a vertically arranged opening therethrough pivotally receiving a pin 162 depending from the cover plate 24 of housing 16. A retaining nut 163 is threaded on the lower end of pin 162. A free pivotal mounting is provided for the deflector 160 so that it can be swung into operative position adjacent the rear face of the slicing knife to deflect the slices onto the receiving pan 140, or can be swung into inoperative position, as shown in Fig. 3, to permit cleaning of the parts of the machine normally hidden by the deflector. Upon removal of the hand nut 163, the deflector will then drop off of the pin 162, to afford complete removal of the deflector. In order to limit the movement of the deflector 160 toward the knife, a stop 165 is mounted on the portion 14 of the base 10 which is adapted to engage a co-operating portion of the deflector 160.

The outer surface of the guard plate 34 preferably lies in a vertical plane slightly back of the vertical plane of the cutting edge of the knife. This guard is generally circular in shape as shown in Fig. 1, but is provided at the lower portion thereof with an outwardly extending flange 168 seating upon a bracket 169 which bridges across from, and is fastened to, the upper surface of the box 50' and the upstanding flange 100 by screws 172. The upper portion of the guard plate 34 is provided with an offset flange 173 which is fastened by screws 173' to a cooperating portion of a cover plate 174, which is in turn provided with outwardly extending lugs 175 and 176 which respectively cooperate with outwardly extending lugs 177 and 178 formed on a grinder casing 179 seating on top of the housing 16. Thumb screws 180 and 181 pass through openings in the lugs 177 and 178 and thread within a bore within the rear surfaces of the lugs 175 and 176 to removably fasten the cover 174 to grinder casing 179. The bracket 169 is provided with spaced openings 170 and 170' through which pass threaded dowel pins 171 and 171' respectively, the pins being fastened in place by upper nuts 182 and locking nuts 182' threaded on the dowel pins and respectively engaging the upper and lower surfaces of the bracket 169. The upper ends of the dowel pins are tapered to receive spaced openings 167' formed through the flange 168 to properly position the guard plate 34 with reference to the front face of the knife 30. The guard plate 34 is thus rigidly fastened at spaced points at its upper end to a fixed part of the machine; and the dowels 171 and 171' may be adjusted with reference to the bracket 169 by loosening the lock nuts 182' to permit horizontal shifting of the pins within the openings 170 and 170' which are of substantially larger diameter than the exterior diameter of the pins, and to also permit rotation of the nuts 182 to shift the pins vertically, the lock nuts 182' being then retightened to hold the pins in adjusted position. The arrangement is such that a rigid support is also provided at spaced points at the lower end of the guard plate, so that when the thumb screws 180 and 181 are tightened to clamp the cover 174 in position, the guard is rigidly and securely clamped in position and properly centered within the recess 33 of the front face of the knife 30 but out of contact with the knife; while ready removability of the guard plate is afforded merely by the removal of the thumb screws 180 and 181.

The edge of the knife opposite to that at which the slicing is performed is provided with an arcuate channel-shaped guard member 183 which is formed at its upper end with an outwardly extending lug 184 having an opening through which passes the thumb screw 181 to hold this end of the guard in fixed position, and is provided at its lower end with an outwardly extending lug 185 having an opening through which passes a thumb screw 186 threading within a bore formed in an upwardly extending lug 187 of the bracket 169. As a further protection a pivoted finger 188 is formed with a bearing lug 189 having an opening receiving the thumb screw 180 so that this finger is mounted in position over the edge of the slicing knife in the space intermediate the grinder casing 179 and the edge of the gage plate 98.

Threaded into the under side of bracket 169 is a bolt 190 on which is pivotally mounted a bearing lug 191 formed integral with an outwardly extending arm 192 to which is fastened at its outer end a scraping blade 194, which is adapted to bear against the peripheral plane surface of the forward side of the knife to maintain the same properly cleaned. The scraper blade 194 is yieldingly urged into engagement with the knife edge by means of a coil spring 195, one end of which is fastened to the bracket 169 and the other end of which is bent over the arm 192 as indicated at 196 (see Fig. 11) in a manner to act resiliently against this pivoted arm.

The enameled slice receiving tray 140 is provided with an upwardly extending flange portion 198 alongside the raised portion 14 of the base. The tray also has a reduced extension or neck 199 which extends between the portion 14 and the slicing knife 30. The flange 198 extends on around this neck and joins with a flange 141, extending adjacent the knife 30, thus providing a trough between the portion 14 and the knife. The slice tray 140 is thus provided with a peripheral enameled flange completely enclosing the side of the tray adjacent the operating parts, so that there are no grease and meat pockets, which are difficult to clean, and a sanitary easily cleaned structure is provided. For convenience in manufacture, the enameled slice receiving tray 140 and the flange 198 may be spaced somewhat from the raised portion 14 of the base, and this space then filled with a suitable plastic filling material, such as gypsum, which hardens to provide a smooth connection between the tray and raised portion with the elimination of grease collecting grooves or joints. The construction of the machine as shown and described provides a substantially imperforate upper exposed surface, so that grease or meat juices cannot penetrate into the interior of the base; and the resilient band 12 resting upon the counter or other support for the machine prevents the ingress of such grease or meat juices from the exterior to hidden portions beneath the base,—to thus provide a structure sanitary and cleanly beyond that hitherto attained.

Positioned beneath the knife is a crumb pan 215. This pan is provided with a rear wall 216, side walls 217 and 218, and a bottom 219, the front of the pan being open. A handle 220 is attached to the bottom wall 219. A stop or bead 221 (of which two are shown, one at each side of the scrap pan) normally retains the scrap pan in position, but the handle permits of lifting the pan over the beads so that it may be removed sideways (away from the plane of the knife) from between the box 50' and flange 100 at the front side of the machine. The rear wall 216 of the scrap pan is provided with a flange portion 222 formed to approximate the curvature of the knife and to closely approach the knife to thus effectively receive scraps, or the like, from the knife face. It also acts, when in position, as a guard for the knife edge. As shown this flange 222 is extended beneath the knife and curved to conform with its edge and is also, preferably, inclined downwardly toward the pan to assist in directing material into the scrap pan. As shown the part of the flange 198, around the neck 199 and adjacent the knife, is constructed to conform with the shape of the flange 222 to such extent as to act as a support therefor.

Ordinarily the pusher plate should be positioned in operative position within the food trough, it being desirable, for safety reasons, that the operator use the pusher plate for forward feeding of the meat, or the like, whenever he may do so. To this end the pusher mechanism is so constructed that its rotary movement entirely out of the trough may be prevented, while leaving entire freedom of positioning to accommodate foodstuffs of different sizes and shapes. Of course there are conditions when the pusher plate cannot be used, or it is more convenient to not use it and the means is therefore provided whereby the operator may, purposely, swing it completely out of the trough. The bearing lug 69 of the member 67 is formed with a curved extension 224 so arranged that after a predetermined angular movement of the pusher plate mechanism in rotation about the rod 66, its edge 226 will contact with the stationary lug 64. As shown in the drawings, this angular movement is of the order of about 100°,— somewhat short of the upper dead center or vertical positioning. The normal range of rotary movement of the pusher mechanism is thus limited, in order that the operator in making necessary adjustment of the pusher plate with reference to the meat may not unintentionally swing the pusher mechanism up beyond the vertical where it may accidentally drop from his hand and fall on the other side, with probable damage to the mechanism. When so limited the operator must hold the pusher mechanism in elevated position, or else it will at once drop back into the trough.

As stated, it is at times desirable to operate without using the pusher plate and in order that this may be accomplished the extension 224 is angularly cut away at one end 228 to permit of additional rotary movement sufficient to carry the pusher mechanism beyond upper dead center where its own weight will retain it in inoperative position. As a safety measure locking means is provided to hold it in such inoperative position.

As shown this additional angular movement may be imparted only after the operator has moved the pusher mechanism to such position that when so swung around the rod 66, it will not undesirably contact with other parts of the machine to cause injury thereto. As illustrated the length of the extension 224 is limited to this end.

Figure 8:
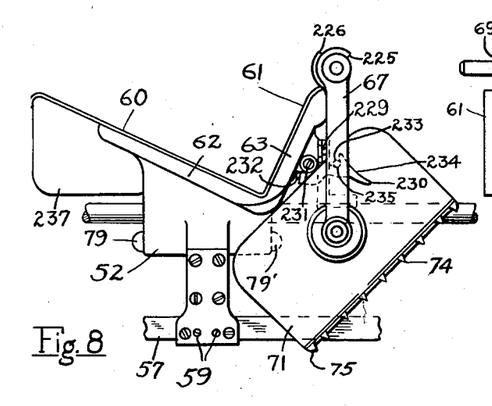
Fig. 8 is a side elevational view of the carriage and pusher plate, with the pusher plate in inoperative position.
Figure 9:
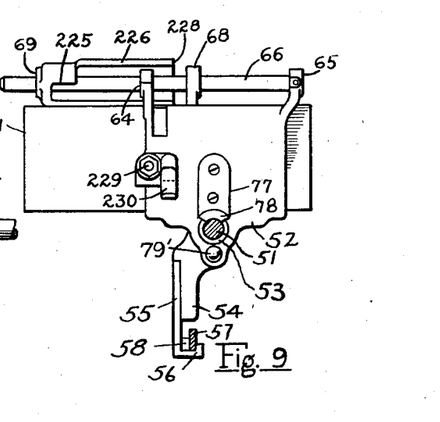
Fig. 9 is an end elevational view of the mechanism of Fig. 8, the view being taken from the right hand side of Fig. 8 with the pusher plate in operative position within the meat support.
Figure 10:
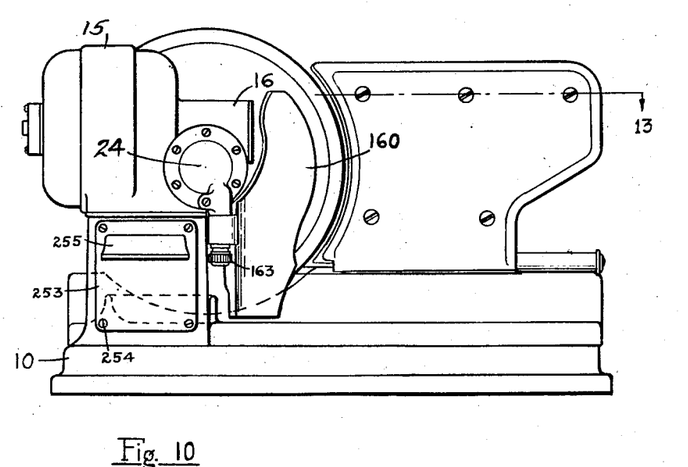
Fig. 10 is a side elevational view of a portion of the machine, the view being taken from the rear side of the machine.

When the pusher plate is moved outwardly a sufficient distance so that the pusher plate is beyond the vertical plane of the track 51 or other parts of the machine or base with which it might contact on swinging movement thereof, the end 228 of the extension 224 then clears the lug 64, and the pusher plate parts are free to be rotated completely out of the trough and into inoperative position as shown in Fig. 8. A spring pressed plunger 229 is mounted in the side wall of carriage 52 in position to engage the member 67 as it swings downwardly into inoperative position to check the force of the falling movement of the arm and pusher plate, should they be allowed by the operator to fall freely. A latch member 230, pivoted at 231 on the carriage 52, is urged by spring 232, mounted within a bore in the carriage 52 and acting against the end of latch member 230, to an upper position as shown in Fig. 1. As the member 67 and pusher plate move into inoperative position, a pin 233 protruding from the side of the member 67 engages the cam surface 234 of latch member 230 and forces it downwardly against the action of spring 232 until the pin 233 falls within notch 235 of the latch member. At this time, spring pressed plunger 229 has retarded the downward movement of the parts, and spring 232 urges the latch member 230 into upper position (as shown in Fig. 8) to hold the pusher plate against free movement, to prevent the flipping or rocking of the pusher plate upon reciprocation of the carriage. The operator may then reciprocate the carriage by grasping hold of the edge of the carriage or other convenient portion thereof, and may push the articles on the meat supporting plate toward the slicing knife by hand without the use of the pusher plate, this being desirable in certain slicing operations. In order that the operator may not extend his fingers into the edge of the knife, below the meat carrying members, a partition or baffle 237 (see Fig. 1) is provided. This is merely so positioned as to serve as a fence or baffle preventing the fingers from being brought into the danger zone beneath the meat carrier.

Because of the construction, using the overhanging grinder casing, etc., when the pusher mechanism is at its extreme inner positioning the pusher plate, upon rotation about the rod 66, would strike thereagainst with possible injury to the mechanism and to the operator. In order to avoid this undesirable result the extension 224 is provided with a lug 225 which, when the pusher mechanism is in this inner positioning, will cooperate with the lug 64 to so limit the rotary movement of the pusher mechanism about the rod 66 as to prevent bringing the pusher plate or other parts thereof forcibly into contact with the grinder casing, or other parts.

When it is desired to again use the pusher plate, the operator may, conveniently, grasp the handle 70 with the fingers and simultaneously press with the thumb on the surface 234 of the latch 230, thus releasing the member 67, whereupon it can then be rotated about rod 66 into operating position within the V-trough. The movement of the pusher plate along the rod 66 is limited by engagement of the movable bearing lug 68 with the stationary bearing lug 65 at the inner end of the stroke of the pusher plate, and with the stationary bearing lug 64 at the outer end of its stroke.

In order to control the operation of the motor, a control member or lever 238 is rigidly fastened at the exterior of base 10 at the operator's end of the machine on a shaft 239 journaled in bearings 240 and 241 in the base 10 and extending beneath the base. Adjacent the other end of shaft 239 and beneath an opening 242 in the base 10 which is in alignment with the raised portion 14, the shaft 239 has pinned thereto a crank arm 243, to the outer end of which is pivotally connected by a socket and cotter pin connection 244 a link 245, which in turn is pivotally connected by a pin and socket connection 246 to a pivotally mounted contact lever 247 of a suitable electric switch which may be of conventional construction. As shown, the switch is a two pole switch having spaced spring contacts 248 and 249 supported by insulating plates 250 and 251, the arrangement being such that when the lever 238 is shifted to thereby shift the crank arm 243 and interconnections, the pivoted lever 247 carrying spring contacts is adapted to engage or disengage with the contacts 248 and 249 with a snap action to open or close the electric circuit of the motor 15. The lever 238 is thus positioned at the operator's end of the machine adjacent the adjusting knob 105 so that the control is centralized. The portion 14 is provided with a removable cover plate 253 fastened thereto by screws 254, this cover plate having a louver 255 and ventilating opening 256 through which air is adapted to be drawn into the interior thereof, and from there through the motor casing into the interior of the motor to cool the motor, the air being discharged through a suitable opening 11F in the under side of the removable cover 16' of the motor casing.

Figures 5, 12:
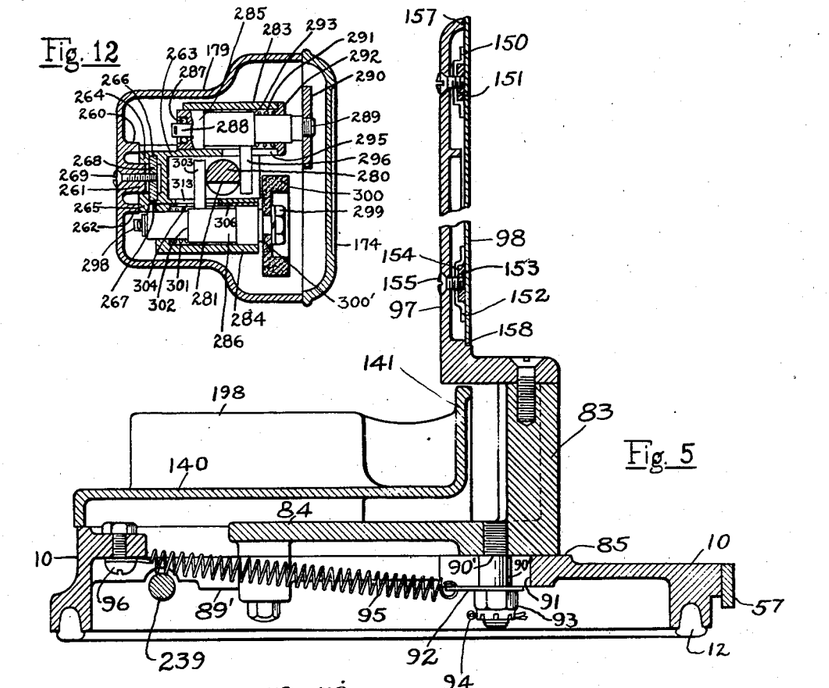
Fig. 5 is a vertical sectional view taken on the plane of the line 5—5 of Fig. 4, the pedestal, motor, gear casing, knife and related parts being removed.
Fig. 12 is a horizontal sectional view taken on the plane of the line 12—12 of Fig. 11, the section being taken so as to pass through the longitudinal axis of each grinder sleeve.
Figures 11, 20:
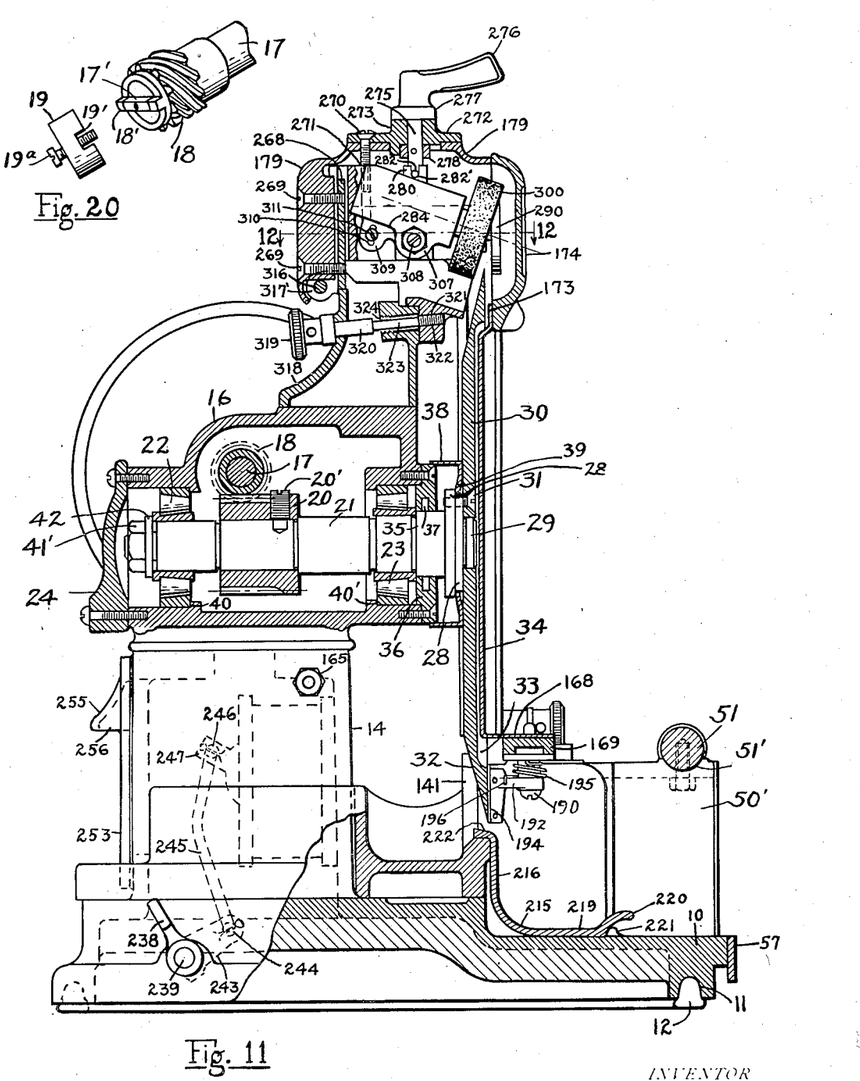
Fig. 11 is a vertical sectional view taken on the plane of the line 11—11 of Fig. 1, the grinder unit within the grinder casing being shown in elevation with certain parts broken away and in section.
Fig. 20 is a perspective view of a detail.
Figure 13:
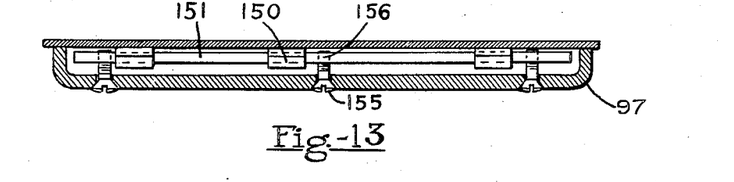
Fig. 13 is a detail sectional view taken on the plane of the line 13—13 of Fig. 10.
Figure 14:
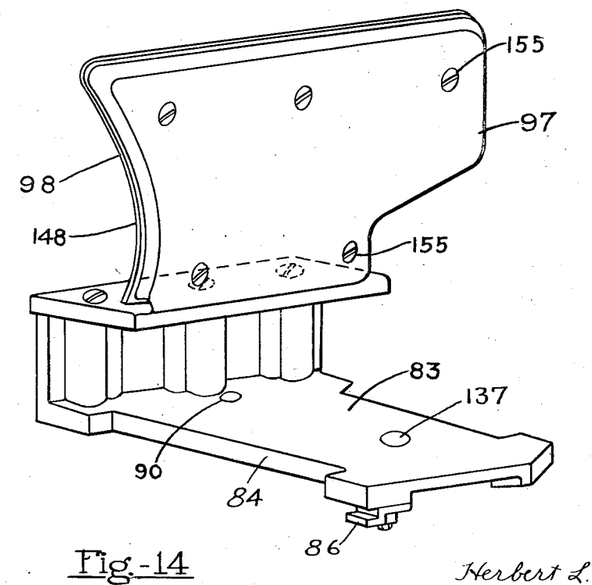
Fig. 14 is a perspective view of the gage plate and slide.
Figure 15:
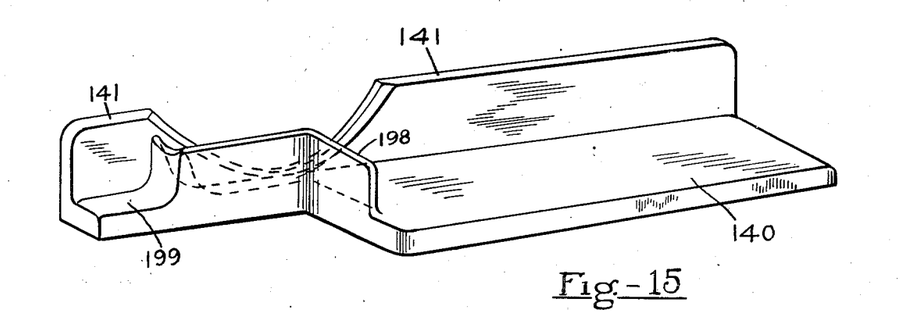
Fig. 15 is a perspective view of the slice receiving tray.
Figure 16:
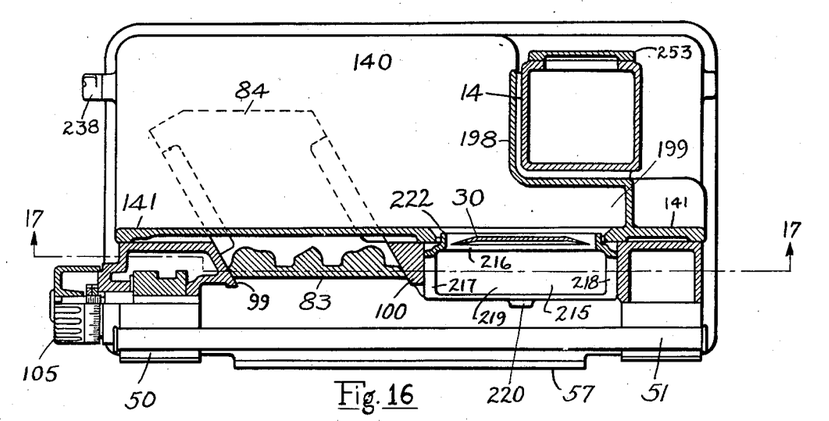
Fig. 16 is a horizontal sectional view taken on the plane of the broken line 16—16 of Fig. 2 with the carriage and related parts and the motor and gear casing and related parts removed.
Figure 17:
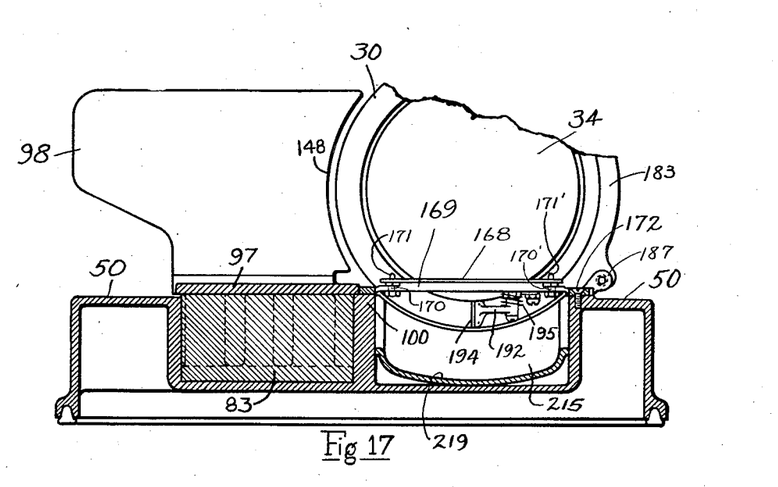
Fig. 17 is a vertical sectional view of the parts shown in Fig. 16 taken on the plane of the line 17—17 of Fig. 16.
Figure 19:
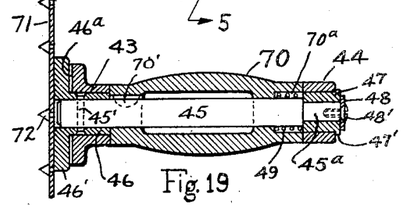
Fig. 19 is a sectional view on the plane of line 19—19 of Fig. 3.

Referring more particularly to Figs. 11 and 12, a grinder casing 179 is provided with a series of vertically extending interior ribs 260, 261 and 262 forming a guide for slidably receiving an interior grinder unit 263. The casing of the grinder unit has rearwardly extending slides 264 and 265 adapted to engage opposite surfaces of the vertical rib 261. The slides 264 and 265 are in turn provided with vertically extending grooves 266 and 267 respectively within which is positioned a rectangular bar 268 which is fastened to the rib 261 by screws 269. The arrangement is such that when the screws 269 are drawn tight the bar 268 forces the slides 264 and 265 rearwardly into engagement with the ribs 260 and 262 to thereby securely fasten the grinder unit 263 in adjusted position. When the screws 269 are loosened, the grinder unit is free to slide up and down the aligned tracks to thereby position the grinders in proper relation to the edge of the knife, and to permit proper adjustment to compensate for wear of the knife edge.

Adjustment of the vertical position of the grinder unit is obtained by means of a screw 270 which is threadedly received within a threaded bore 271 in the top of the grinder unit. This screw passes through the top of the grinder casing 179 and through an overlying cover member 272 having an upstanding centrally arranged boss 273 with an axial bore within which is rotatably mounted a control shaft 275 carrying at its outer end on the exterior of the casing a control handle 276. The handle is provided with a collar 277 pinned to shaft 275, the collar overlying boss 273 to support shaft 275. A collar 278 pinned to shaft 275 on the under side of the cover 272 serves to prevent play and axial movement of the shaft. Shaft 275 is interconnected on the interior of the grinder casing with a cam member 280 having a cutaway portion or flat 281 on one side thereof, the cam member being rotatably mounted in suitable bearings within the grinder unit 263. This interconnection is by means of a cross pin 282 carried by shaft 275, the opposite protruding ends of pin 282 being received within diametrically opposed elongated slots 282' formed in the upper end of the cam 280.

The grinder unit 263 carries cylindrical sleeves 283 and 284 within which are slidably mounted bearing members 285 and 286 respectively. Rotatably mounted in ball bearing 287 in member 285 is a spindle 288 to which is fastened at its outer threaded end 289 a hardened steel grinding disk 290 which is adapted to contact with the front peripheral surface of the knife to remove the burr therefrom. The grinding wheel 290 is urged by spring 291, bearing at one end against a cover 292 attached to sleeve 283 and at the other end against a shoulder 293 of bearing member 285, toward operative grinding position with wheel 290 resiliently pressed by spring 291 against the knife. Sleeve 283 is provided at one side thereof with a longitudinal slot 295 through which passes a pin 296 rigidly carried by bearing member 285. In the position shown in Fig. 12, the cam member 280 bears against pin 296 to hold the grinder 290 out of contact with the knife against the action of spring 291.

Bearing member 286 rotatably receives in suitable bearings a spindle 298 to which is fastened at its outer threaded end by nut 299 a grinding stone 300, the stone being pressed rigidly into place against a shoulder 300' on spindle 298. Bearing member 286 is urged by spring 301 positioned between the end of sleeve 284 and a shoulder 302 on the bearing member toward operative grinding position with wheel 300 resiliently pressed into contact with the rear beveled surface 32 of the rotary knife. In the position shown in Fig. 12, the grinding wheel 300 is also held out of operative engagement with the knife by means of the cam member 280 engaging an arm 303 protruding through slot 304 in the side wall of sleeve 284. By moving handle 276 clockwise as shown in Fig. 3 to position designated "1", cam member 280 will be rotated so as to bring the cutaway portion 281 opposite the arm 303, so that the spring 301 is then free to move the grinding wheel 300 into contact with the beveled edge of the knife to perform the grinding operation, wheel 300 and spindle 298 being rotated by contact with the knife driven by motor 15. By rotating handle 276 counterclockwise from this position to that shown in Figs. 3 and 12, the cam member 280 first forces the arm 303 and bearing member 286 to inoperative position to remove stone 300 from contact with the knife; and then upon a further counterclockwise movement of the handle 276 to the position designated "2", the flat 281 is brought opposite the arm 296 to permit the bearing sleeve and grinding wheel 290 to move into contact with the front side of the knife under the action of spring 291 to thereby remove the burr resulting from the grinding operation. The handle 276 is then moved back to neutral position, which is that shown in Figs. 3 and 12, and is the position which the parts are normally maintained during actual slicing operation of the machine. The slots 282' are elongate to permit the desired range of vertical adjustment of the grinder unit 263 by screw 270, the shaft 275 and pin 282 sliding within the cam 280 and slots 282' during such vertical adjustment.

In order to permit the grinding wheel 300 to be brought into contact with the beveled edge 32 of the knife at various angular inclinations, the casing of the grinder unit 263 is split as shown at 306, so that the sleeve 284 carrying the bearing member 286 and grinding wheel 300 is free to move relative to the other parts of the grinder unit 263. The sleeve 284 is provided with a downwardly depending lug 307 through which passes a pivot pin 308 fastened to the other part of the casing of the grinder unit 263. The sleeve 284 is also provided with a lug 309 within which is an arcuate slot 310 which receives a locking screw 311 threaded within the other part of the casing of the grinder unit 263. By loosening the screw 311, the sleeve 284 may be rocked about the pivot 308, the arcuate slot 310 moving past the screw. The screw 311 is then tightened to clamp the sleeve 284 and parts carried thereby in adjusted position, with the grinding stone 300 at the desired inclination. The other part of casing of the grinder unit 263 is provided with a longitudinal slot 313 opposite slot 304 in sleeve 284 through which the pin 303 extends, the slot 313 having sufficient width to accommodate the desired range of pivotal movement of the sleeve 284 about the pivot pin 308.

The grinder casing 179 is provided with a bore through which passes a pivot pin 316 (see Fig. 11) mounted in lugs 317 extending from a lower stationary member 318 which is fixedly mounted upon the housing 16 and supports the grinder casing 179 therefrom. In order to retain the casing 179 in its normal position shown in Fig. 11, a thumb screw 319 is pinned to a shaft 320 which is threaded at its outer end 321 and is threadedly received within a bore 322 in a lower portion of the grinder casing 179. The shaft 320 is provided with a portion 323 of reduced diameter immediately behind the threaded portion 321, this portion 323 passing through a threaded bore 324 in the stationary member 318. The arrangement is such that when the thumb screw is turned to remove the threaded end 321 from the bore 322 of the grinder casing 179, the screw will not be permitted to fall out of its socket in the member 318, but the threads 321 will then engage within the threads 324. When the screw 319 is thus loosened, and when the cover plate 174 is removed by removal of the thumb screws 180 and 181, the grinder casing 179 is then free to be tilted about the pivot pin 316 to a position away from the knife 30 so as to facilitate cleaning of the then exposed grinder parts.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a slicing machine, having a rotary knife, track means, a carriage mounted on said track means for movement across the face of said knife, a V-shaped article supporting trough carried by said carriage, a pusher plate pivotally and slidably mounted adjacent the upper rear side of said V-shaped trough, said pusher plate being slidably mounted for movement in said trough toward and away from the cutting plane of said knife, and being pivotally mounted for rotation to a position out of normal operating position within said trough, means for limiting upward pivotal movement of said pusher plate out of said trough, in a certain portion of its slidable travel, so that it will not pass beyond the vertical, whereby articles may be positioned within said trough beneath said pusher plate but so that said pusher plate may be swung only to positions from which it returns by gravity into operative position within said trough, and additional means for further limiting the upward pivotal movement of said pusher plate adjacent the inner end of its slidable stroke adjacent the plane of the cutting edge of said rotary knife.

2. In a slicing machine, track means, a carriage mounted for movement on said track means having an article supporting plate, a pusher plate operating within said supporting plate, a bar on which said pusher plate is pivotally and slidably mounted, a support for said bar, and a pivot lug carried by said pusher plate slidably and pivotally engaging said bar, said pivot lug having a portion overlying said support throughout a major portion of the range of slidable movement of said pusher plate and adapted to contact with said support on pivotal movement of the pusher plate to limit such pivotal movement to less than top dead center so that said pusher plate is constrained to return by gravity to operating position within said article supporting plate when released by the operator.

3. In a slicing machine, track means, a carriage member mounted for movement on said track means, an article supporting plate on said carriage, a pusher plate member pivotally and slidably mounted on said carriage for movement along said supporting plate and for rotation away from said supporting plate, a plurality of stepped contact surfaces carried by one of said members, and stop means carried by the other of said members cooperating with said stepped contact surfaces to provide different degrees of rotational movement of said pusher plate member away from said supporting plate in different operating positions of the range of slidable movement of said pusher plate member along said supporting plate.

4. In a slicing machine, track means, a carriage mounted for movement on said track means, a V-shaped article supporting plate carried by said carriage, a pusher plate mechanism pivotally and slidably mounted on said carriage adjacent the upper rear side of said V-shaped supporting plate, said pusher plate being adapted to be swung about its pivot from an operative position upwardly out of said supporting plate and then downwardly about the pivot to an inoperative position adjacent the rear side of said carriage, a spring pressed plunger adapted to engage said pusher plate mechanism to check the force of the pivotal movement of said pusher plate mechanism as it is swung to inoperative position, and a spring pressed latch adapted to engage a cooperating part of said pusher plate mechanism to retain said pusher plate mechanism in inoperative position.

5. In a slicing machine, a base, spaced projections on said base having segmental depressions formed in the upper surfaces thereof, a circular track mounted within said segmental depressions so as to leave the upper surface of said track exposed, a guiding track, a carriage having a bearing portion mounted for reciprocation on said circular track intermediate said spaced projections, said carriage engaging said guiding track, a pusher plate mounted for movement on said carriage, an arm extending outwardly from said carriage, and an outboard bearing shoe carried by said arm slidably engaging said upper exposed surface of the circular track for stabilizing the movement of said carriage and adapted to override one of said projections.

6. In a slicing machine having a frame supporting a rotary knife, track means, a carriage mounted for movement on said track means across the face of said knife, said frame supporting a projecting member overlying said carriage in one position of its operating movement, an article supporting plate mounted on said carriage, a pusher plate mounted on said carriage for movement in normal operating position along said article supporting plate toward and away from the plane of said knife, said pusher plate being also pivotally connected to said carriage and adapted for rotation away from the article supporting plate, means for limiting upward pivotal movement of said pusher plate away from said article supporting plate in a certain portion of its operating travel toward and away from the plane of the knife, so that the pusher plate will not pass beyond the vertical, whereby articles may be positioned on said supporting plate beneath said pusher plate but so that said pusher plate is constrained to return by gravity to operative position relative to said supporting plate when released by the operator, and additional means for further limiting the upward pivotal movement of said pusher plate in the portion of its operating travel adjacent the plane of the knife so that said pusher plate is maintained out of contact with said projecting member supported by the frame.

7. In a slicing machine having a rotary knife, track means, a carriage mounted for movement on said track means across the face of said knife, an article supporting plate mounted on said carriage, a pusher plate means mounted on said carriage for movement in normal operating position along said article supporting plate toward and away from the plane of said knife, said pusher plate means being also pivotally connected to said carriage and adapted for rotation through a substantial angle away from said article supporting plate in a certain portion of its range of movement along said article supporting plate toward and away from the plane of said knife, means for limiting upward pivotal movement of said pusher plate means away from said article supporting plate in said mentioned portion of its operating travel toward and away from the plane of the knife, so that the pusher plate means will not pass beyond the vertical, whereby articles may be positioned on said supporting plate beneath said pusher plate but so that said pusher plate is constrained to return by gravity to operative position relative to said supporting plate when released by the operator, said pusher plate means when in a certain limited range of its slidable travel adjacent the outer end of its stroke being adapted to swing completely away from above said article supporting plate and around to an inoperative position adjacent the under side of said article supporting plate, and means on said carriage so located as to operatively engage said pusher plate means as it is swung to said inoperative position and for holding it in said inoperative position.

8. In a slicing machine, track means, a carriage mounted for movement on said track means, an article supporting plate for said carriage, a pusher plate operating along said supporting plate, a bar on which said pusher plate is pivotally and slidably mounted, a support for said bar intermediate the ends thereof, and pivot lugs carried by said pusher plate and slidably and pivotally engaging said bar on opposite sides of said intermediate support, one of said pivot lugs having an extension overlying said intermediate support throughout the major portion of the range of slidable movement of said pusher plate from adjacent the inner end of its stroke outwardly, said extension being adapted to contact with said support on pivotal movement of said pusher plate to limit such pivotal movement, and such extension being adapted to clear said intermediate support to provide for pivotal movement of greater extent of said pusher plate when adjacent the outer end of its stroke.

9. In a slicing machine, track means, a carriage mounted for movement on said track means, an article supporting plate on said carriage, a pusher plate pivotally and slidably mounted on said carriage for movement in said supporting plate, said pusher plate being adapted to swing on its pivotal mounting from an operative position within said supporting plate to an inoperative position out of said supporting plate, and latch means pivotally mounted on said carriage adapted to overlie a portion of said pusher plate in inoperative position positively restraining said pusher plate against swinging movement in such position during movement of the carriage.

10. In a slicing machine having a rotary knife, track means, a carriage mounted for movement on said track means across the face of said knife, an article support carried by said carriage, a pusher plate for said article support, means for slidably mounting said pusher plate for movement along said article support toward and away from said knife, and for pivotally mounting said pusher plate for swinging movement away from said article support, said pusher plate being free to swing away from said article support through a substantial angle about its pivotal mounting throughout a major portion of its range of slidable movement toward and away from said knife to enable an article to be placed on said article support beneath said pusher plate, said portion being the portion of said range which is nearer to the cutting plane of the knife, and means for definitely limiting the extent of said swinging movement within said portion of the range to prevent said pusher plate from passing beyond its upper dead center position with respect to its pivotal mounting so that said pusher plate returns by gravity to an operative position relative to said article support.

11. In a slicing machine which includes a knife and means for actuating it, and a carriage and means for guiding the carriage past the cutting edge of the knife, a work supporting member associated with said carriage, and including a rearwardly overhanging work receiving trough, a guide mounted on the carriage adjacent said trough, a pusher plate movable in said trough toward and away from the cutting plane of the knife, means for mounting the pusher plate upon the guide including an arm, upon which said pusher plate is mounted, extending radially from said guide and mounted thereon for sliding and rotary movement with respect thereto, said pusher plate being rotatable in relation to said arm, about an axis parallel with the axis of said guide, and means underneath the trough and intermediate the ends thereof for supporting said pusher plate and for holding it in inoperative position out of alignment with said trough, and underlying said trough.

12. In a slicing machine, a base having spaced upward projections thereon, track means supported on said projections and connected to said projections so as to expose an upper side of the track means directly above one of said spaced projections, a carriage mounted for reciprocating movement on said track means, a pusher plate mounted on said carriage for movement relative thereto, a main bearing carried by said carriage intermediate the ends thereof for slidably supporting said carriage on said track means, and an outboard bearing shoe carried by said carriage at one end thereof and adapted to engage the upper side of said track means so as to ride over one of said spaced projections.

13. In a slicing machine having a base, a rotary knife mounted on said base, track means on said base, a carriage mounted for movement on said track means across the face of said knife, an article supporting plate on said carriage having a portion extending outwardly from the base beyond said track means, a pusher plate means slidably mounted on said carriage for movement in said article supporting plate toward and away from the cutting plane of said knife, and pivotally mounted on said carriage for swinging movement within the said carriage parallel to the cutting plane of the knife and throughout its normal operative range and for swinging movement within said article supporting plate and around to an inoperative position underneath said article supporting plate, means preventing said pivotal movement of the pusher plate means around to said inoperative position except when the pusher plate means is in the outer range of its slidable movement away from the cutting plane of said knife, so that said pusher plate means in the inoperative position is arranged outwardly beyond said track means, and means on said carriage for holding said pusher plate means in said inoperative position underneath the article supporting plate, the arrangement being such that said carriage can be moved back and forth in a normal manner on said track means while said pusher plate means is held in said inoperative position.

HERBERT L. JOHNSTON.